3,320,255
PRODUCTION OF THIOETHERS
Cevat Kalav, Wesseling, Bezirk Cologne, Germany, assignor to Union Rheinische Braunkohlen Kraftstoff Aktiengesellschaft, Wesseling, near Cologne, Germany, a corporation of Germany
No Drawing. Filed May 24, 1963, Ser. No. 282,855
Claims priority, application Germany, June 9, 1962, U 9,033; June 29, 1962, U 9,082; July 13, 1962, U 9,111; Sept. 11, 1962, U 9,251; Mar. 30, 1963, U 9,684
5 Claims. (Cl. 260—248)

This invention relates to a new process of producing thioethers, more specifically to a process of producing thioethers by reacting methylol compounds with sulfides, and to the novel thioethers thereby produced. According to the invention the novel thioethers are produced by reacting a methylol compound under acidic conditions with hydrogen sulfide if the methylol group is attached to a N-atom.

By the expression "methylol compound," it is meant to include any organic compound which contains one or more —$CH_2OH$ radicals and can be obtained by reacting in known manner the basic compound with formaldehyde. Examples of compounds coming within the scope of the above definition are N-methylol propioamide, N-methylol benzamide, N-methylol thiobenzamide, monomethylol urea, dimethylol urea, dimethylol ethylene urea, dimethylol isothiourea, hexamethylol melamine, 1-methyl-4-keto-3,5-dimethylol-hexahydro-1,3,5-triazine and the like. Furthermore, the —$CH_2OH$ radicals may be substituted in any manner Obviously, the new process can be conducted in a very broad scope. The aforementioned methylol compounds show that aliphatic and aromatic as well as heterocyclic compounds may be converted to the corresponding thioethers. The reaction should be carried out under acidic conditions and preferably at a pH below 5.0. Such a pH may be obtained by incorporating in the reaction mixture the required amount of an acid or acid reacting salt, e.g. HCl.

Suitable and preferred temperature ranges for the reaction vary from 0 to 100° C. and from 20 to 40° C. respectively. Agitation of the reaction mixture is desirable. By controlling the temperature it is in certain cases possible to control the conversion of the methylol groups to the corresponding thioether groups. Accordingly, the monothioether and the dithioether are obtained by reacting 2,6-dimethylol-p-cresol with 2-mercaptobenzothiazole at a temperature of about 20° C. and of betwen 50 to 60° C., respectively.

The reaction is preferably carried out under atmospheric pressure, but sometimes it may be advantageously performed at a moderately elevated pressure. Any inert solvent for the reactants, such as benzene, toluene, ether, acetone, dioxane can be used. It is not always necessary to use the pure methylol compounds. They may be reacted with the hydrogen sulfide without prior isolation and purification.

If the methylol compound is reacted with hydrogen sulfide, the obtained thioethers contain the group —$CH_2 \cdot S \cdot CH_2$—. In a similar way polythioethers can be obtained if more than one $CH_2OH$— group is present in the methylol compound.

The thioethers may be recovered from the reaction mixture in a known manner. In general they are obtained having a high degree of purity and in good yields. Because of their high sulfur content they are useful in many arts, for example as parasiticides, as vulcanizing agents for rubber, as dye intermediates, and as pharmaceuticals.

The following examples are presented to illustrate the invention which is, of course, not limited to the specific details given therein. All parts given are by weight.

Example 1

20.6 g. of N-methylolpropioamide was suspended in 60 cc. of acetone, and the mixture was saturated with hydrogen sulfide. After the addition of 1 cc. of concentrated HCl solution of the N-methylolpropioamide was completed. The reaction mixture was then intensively stirred for 3 hours while slowly passing through it a stream of hydrogen sulfide. The resultant mixture was neutralized with concentrated caustic soda solution, and the precipitate which formed was filtered out. The filtered solution was concentrated, and the thus obtained product was recrystallized from acetone giving 17.2 g. (85% yield) of bis-(propionylaminomethyl)-thioether, M.P. 65° C.

Analysis.—Calcd.: C, 47.1; N, 13.7; S, 15.7. Found: C, 47.3; N, 13.8; S, 15.3.

Example 2

Following the procedure described in Example 1, 26 g. of N-methylol benzamide dissolved in 250 cc. of acetone were reacted with hydrogen sulfide. After recrystallization from methanol, 22.8 g. (89% yield) of bis-(benzoylaminomethyl)-thioether, M.P. 176° C., were obtained.

Analysis.—Calcd.: C, 64.0; N, 9.3; S, 10.7. Found: C, 64.0; N, 8.6; S, 10.8.

Example 3

The procedure of Example 1 was repeated using 30 g. of N-allyl-N'-methylol urea suspended in 100 cc. of acetone and 14 cc. of concentrated HCl. After recrystallization from methanol 12.2 g. (36% yield) of bis-(N-allyl-N'-methyl urea)-thioether, M.P. 172° C., were obtained.

Analysis.—Calcd.: C, 46.5; N, 21.7; S, 12.4. Found: C, 46.6; N, 21.6; S, 12.8.

Example 4

Hydrogen sulfide was passed through a suspension of 20 g. of N,N'-dimethylol-1-methyl-4-keto-hexahydro-1,3,5-triazine in 250 cc. of acetone for 90 minutes. Then 7.5 cc. of concentrated HCl were added during which time the suspension was well stirred and the introduction of hydrogen sulfide was continued. After a reaction time of 6 hours the now clear solution was neutralized resulting in the formation of two layers. The upper oily layer was partly evaporated in vacuum, and the thus obtained light-brown oil was mixed with acetone and dried over sodium sulfate which was then removed by filtration. The filtrate was evaporated to dryness whereby 18.6 g. of the thioether were obtained.

Analysis.—Calcd.: S, 24.2. Found: 22.2.

What is claimed is:

1. A process for producing thioethers which comprises reacting in liquid phase an organic N-methylol compound with hydrogen sulfide in the presence of hydrochloric acid at a temperature of between 0 and 100° C. and recovering the thus formed thioether from the reaction mixture.

2. The process of claim 1 wherein the N-methylol compound is N-methylolpropionamide.

3. The process of claim 1 wherein the N-methylol compound is N-methylol benzamide.

4. The process of claim 1 wherein the N-methylol compound is N-allyl-N'-methylol urea.

5. The process of claim 1 wherein the N-methylol compound is N,N'-dimethylol-1-methyl-4-keto-hexahydro-1,3,5-triazine.

(References on following page)

References Cited by the Examiner

UNITED STATES PATENTS 2,356,604  8/1944  Mathes et al. _____ 260—302

OTHER REFERENCES

Buu-Hoi et al.: J. Org. Chem., vol. 16 (1951), pp. 988–94.

Folkins et al., in a paper delivered at the Fairmont Hotel, San Francisco, California, on May 15, 1962, recorded in Proc. Am. Petrol. Inst., vol. 42 (1962), pp. 187–96.

Ruderman et al.: J. Am. Chem. Soc., vol. 71 (1949), p. 2264.

ALEX MAZEL, *Primary Examiner.*

RICHARD J. GALLAGHER, *Assistant Examiner.*